United States Patent [19]

Otsubo

[11] Patent Number: 5,172,354
[45] Date of Patent: Dec. 15, 1992

[54] COMPATIBLE DISK PLAYER FOR PLAYING MULTI-SIZE DISKS AND HAVING A MODE FOR SELECTING ONE DISK TYPE

[75] Inventor: Hiroshi Otsubo, Saitama, Japan

[73] Assignee: Pioneer Electronic Corporation, Tokyo, Japan

[21] Appl. No.: 582,038

[22] Filed: Sep. 13, 1990

[30] Foreign Application Priority Data

Apr. 11, 1990 [JP] Japan ................... 2-95546

[51] Int. Cl.$^5$ .............................. G11B 7/00
[52] U.S. Cl. ................... 369/44.27; 369/188; 369/54; 369/58
[58] Field of Search ........... 369/50, 48, 59, 188, 369/187, 2, 15, 32, 30, 34, 40, 56, 58, 54, 44.27, 184

[56] References Cited

U.S. PATENT DOCUMENTS

| | | | |
|---|---|---|---|
| 4,723,235 | 2/1988 | Yasuda et al. | 369/50 |
| 4,724,492 | 2/1988 | Kosaka et al. | 369/50 |
| 4,759,008 | 7/1988 | Hirano et al. | 369/197 |
| 4,773,052 | 9/1988 | Sugiura et al. | 369/54 |
| 4,773,057 | 9/1988 | Otsuka et a. | 369/197 |
| 5,056,075 | 10/1991 | Marata et al. | 369/58 |

Primary Examiner—Wayne R. Young
Assistant Examiner—Nabil Hindi
Attorney, Agent, or Firm—Sughrue, Mion Zinn Macpeak & Seas

[57] ABSTRACT

The present invention relates to a compatible disk player, which is capable of playing compact disk CD or laser disk LD. More specifically, the disk player of the present invention reduces the delay time between loading and actually playing a disk. It includes a manual switch on the disk player, from which a person may select the type of disk to play, thereby decreasing the time needed to determine which type of disk is entered. If the CD mode is selected or the last disk to be played was a CD, the player pick-up is placed in the initial playing position of the CD before a disk is entered. After entering a disk, if it determines that an LD is loaded or the CD mode is cancelled (by the manual switch) the pick-up is moved to a ready position for the LD. By including a manual switch and circuitry which assumes the next disk type is the same as the last, the present invention reduces the time needed to determine which type of disk is loaded.

11 Claims, 3 Drawing Sheets

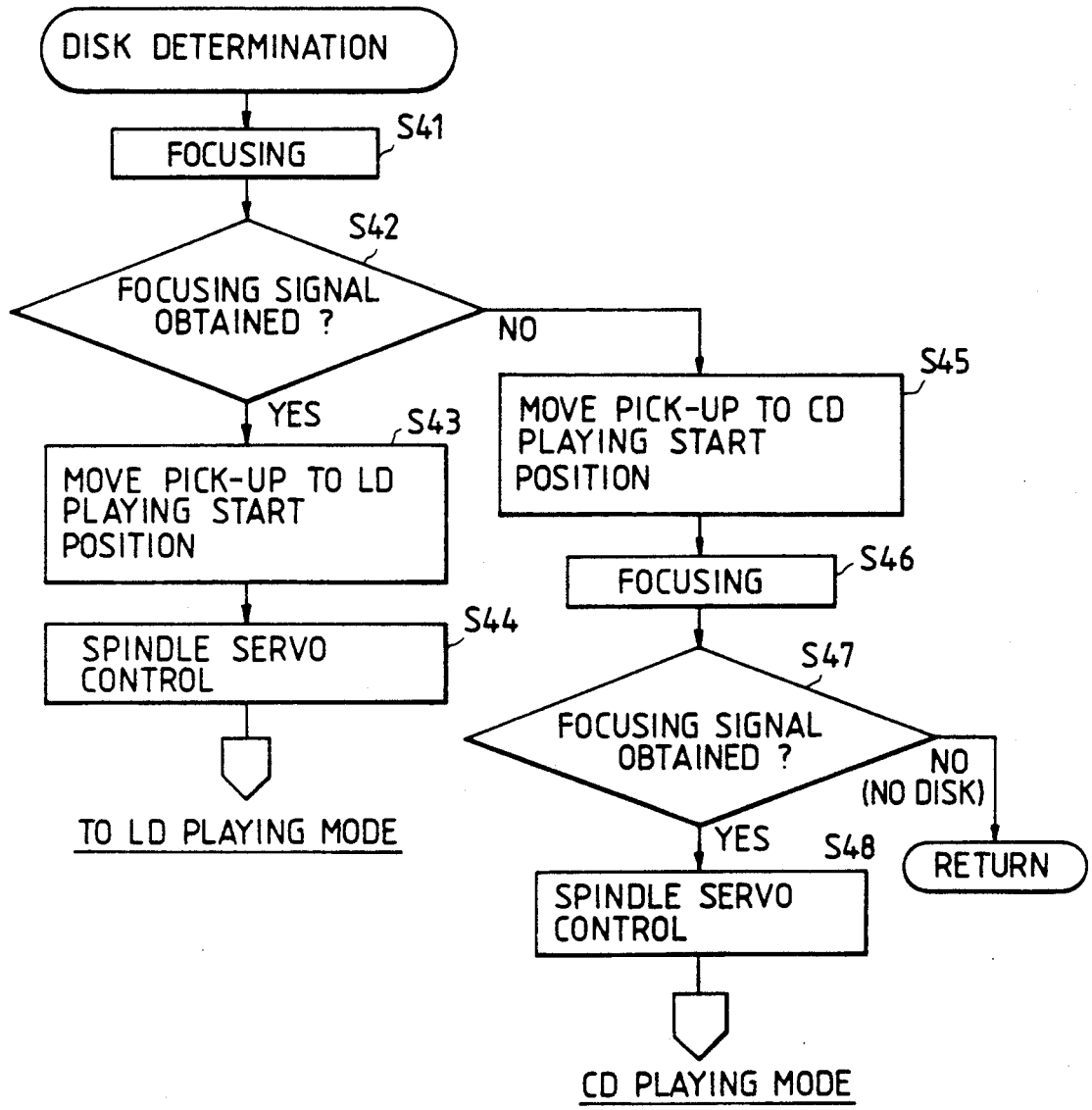

COMPATIBLE DISK PLAYER FOR PLAYING MULTI-SIZE DISKS AND HAVING A MODE FOR SELECTING ONE DISK TYPE

BACKGROUND OF THE INVENTION

The present invention relates to a compatible disk player for playing both a digital audio disk CD (compact disk) and a video disk LD (laser disk).

Generally, a compatible disk player, which is a general term meaning both CD and LD compatible, automatically loads a disk. Within the compatible disk player, the initial playing position of the pick-up relative to the disk will differ between CD and LD systems. Consequently, it is necessary to determine whether the disk to be played is a CD or LD. The disk type is determined by detecting its size, since CD's conform to two smaller diameter disks; namely, 8 cm or 12 cm, while LD's conform to two larger diameter disks; namely, 20 cm or 30 cm.

The methods for determining the disk type by detecting its size include, (1) a determination method using photo sensors and (2) a determination method using a sequence operation.

In the photo sensor method, at least two photo sensors are used for the CD system and the LD system. This combination of sensor outputs can determine three cases, including a CD presence, an LD presence, and the absence of either disk. However, this method results in increasing the production cost, in view of the additional circuitry and sensors.

Alternatively, the sequence operation of the second determination method may be used, as will be described hereafter in reference to the flow chart shown in FIG. 4. Before the disk type is determined a ready position of the pick-up is set wherein the ready position is located radially beyond the outer diameter of the 12 cm CD and radially within the outer diameter of the 20 cm LD. While the pick-up is set in the ready position, a focusing operation is executed (step S41) to determine whether a focusing servo signal is obtained at the ready position (step S42). When the focus servo signal is obtained, it means an LD is mounted in the playing position. Therefore, the pick-up is moved to the initial playing position of the LD (step S43), and the spindle servo control is executed (step S44). The compatible disk player is then ready to play the LD.

Alternatively, if the focus servo signal is not obtained, it means an LD is not mounted. Thereafter, the pick-up is moved to the playing start position of the CD (step S45). In this position, the focusing operation is executed again (step S46) to determine whether the focus servo signal is obtained at the playing start position of the CD (step S47). When the focus servo signal is obtained, it is determined the CD is mounted at the playing position. Therefore, the spindle servo control is executed to shift to a CD play mode (step S48). When the focus servo signal is not obtained, it means the CD is not mounted at the playing position. Then the player determines there is no disk present.

In the second determination method (sequencing operation), whenever the disk is mounted, the aforementioned sequence operation is executed. However, before the CD is played, it is always necessary to check that an LD is not mounted. Thus, a delay results between the time the CD is set on the loading tray and a playback sound is generated. This delay is longer than the start delay of a dedicated CD player. As an example, in order to play the CD, assuming that it takes 4 seconds to load and clamp the disk, 2 seconds for the first focusing operation (step S41), 2 seconds for the moving operation of the pick-up to the CD playing start position (step S45), 2 seconds for the second focusing operation (step S46), and 2 seconds for the spindle servo control operation (step S48). Thus, a total of 12 seconds is required from the loading operation to beginning the CD reproduction.

Generally, an LD and CD are not always alternately played. In other words, the user who plays a CD is more likely to play another CD as opposed to an LD. Thus, the 12 sec. time delay between loading and playing each CD is inconvenient for the user.

SUMMARY OF THE INVENTION

An object of the present invention is to provide a compatible disk player wherein the time delay between the loading operation and playing operations is shortened.

The compatible disk player according to the present invention comprises commanding means for setting and cancelling a CD playing mode by a manual operation, and position controlling means for positioning a pick-up at an initial playing position on the CD to prepare for the subsequent operation. The player also includes disk detecting means for detecting when an LD is loaded and outputting the appropriate detection signal. The position controlling means cancels the ready state of the pick-up at the initial playing position of the CD in accordance with a cancel command or a detection signal. By cancelling the ready state the pick-up is moved radially outward beyond the CD diameter, since the cancel command and the LD detection signal mean an LD is to be played next.

In the compatible disk player according to the present invention, the setting and the cancellation of the CD playing mode are commanded by manual operations. In the CD playing mode, the pick-up is placed in the initial playing position of the CD to get ready for the subsequent operation. When it is determined that the LD is mounted at the playing position in the CD playing mode or when the cancellation command of the CD playing mode is issued, the ready state of the pick-up in the initial playing position of the CD is cancelled.

BRIEF DESCRIPTION OF THE DRAWINGS

FIG. 4 is a flow chart showing a sequence operation of a conventional disk determination method.

DESCRIPTION OF THE PREFERRED EMBODIMENT

Figure 1:
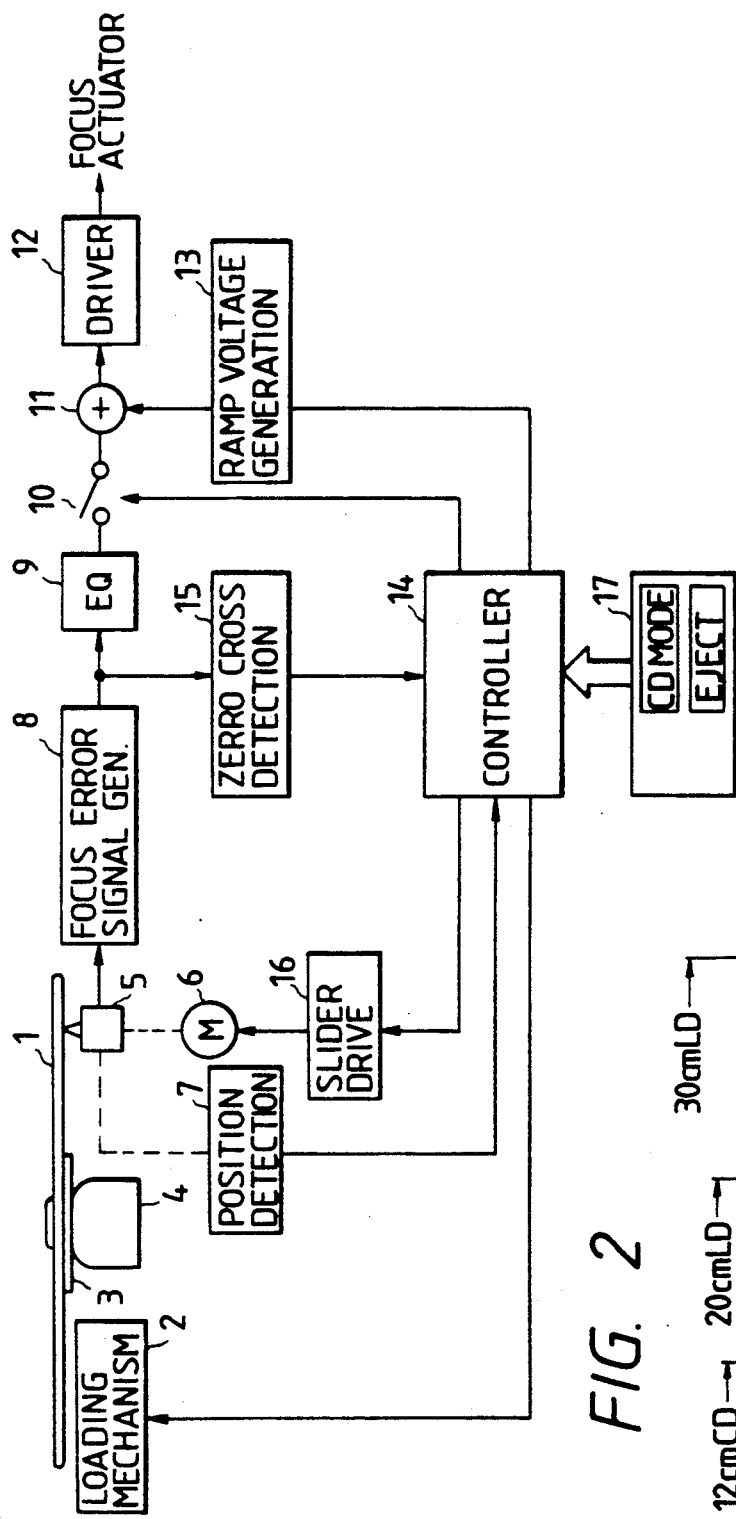
FIG. 1 is a block diagram showing the structure of a control system of a compatible disk player according to the present invention.

By referring to the accompanying drawings, an embodiment of the present invention will be described hereafter. FIG. 1 is a block diagram showing the structure of a control system of a compatible disk player according to the present invention. In the figure, a disk 1 is mounted on a turntable 3 by means of a loading mechanism 2 including a tray (not shown in the figure)

extrudable to the main unit of the player. The disk 1 is rotatably driven by a spindle motor 4. The recording information of the disk 1 is read by an optical pick-up 5. The pick-up 5 is provided with an optical system including a semiconductor laser with an objective lens, a light detector for receiving light reflected from the information recording surface of the disk 1, and a focus actuator for controlling the position of the objective lens in the optical axis direction against the information recording surface of the disk 1. The pick-up also includes a tracking actuator for controlling the position of the light beam spot originated from the pick-up 5 in the disk radius direction against the recording track. The pick-up 5 is equipped with a slider (not shown) which moves in the radial direction of the disk 1 and uses a slider motor 6 as the drive source. The position of the pick-up 5 is detected by a position detector 7 which includes an encoder or a switch group (not shown). The switch group is opened or closed when in contact with part of the slider which is provided on the slider traveling path.

The output signal of the light detector is sent to a focus error signal generation circuit 8, which generates a focus error signal by means, such as, a known astigmatism method. The frequency and phase characteristics of the focus error signal are compensated by an equalizer (EQ) circuit 9. After which, the error signal is sent to an adder 11 as one input through a loop switch 10. The focus error signal output from the adder 11 is sent through a driver 12 and becomes a drive signal of the aforementioned focus actuator (not shown) in the pick-up 5. The focus actuator causes the objective lens in the pick-up 5 to be moved along the optical axis in a direction corresponding to the polarity and level of the focus error signal.

In the aforementioned manner, a focus servo loop is formed. When a loop switch 10 is turned on (closed), the loop is closed, thereby placing the focus servo loop in a lock enable state. While in this state.... the focus servo loop generates a focus lock signal, indicating that the beam spot is in focus. By driving the focus actuator in accordance with the focus error signal, the light beam spot can be precisely focused on the information recording surface of the disk 1.

In addition, a ramp voltage generated by a ramp voltage generation circuit 13 is applied to the other input of the adder 11. The ramp voltage is generated when the servo loop is open, according to a focusing command from the controller 14. This voltage becomes a drive signal for the focus actuator so that a focus sweep operation is executed. This operation forcibly moves the objective lens between two positions surrounding the in-focus position in accordance with the focusing command. A zero cross detection circuit 15 determines whether or not the level of a focus error signal in the so-called S letter curved characteristic obtained by the focus sweep operation of the objective lens is nearly zero. The determined output signal is sent to the controller 14. An operation section 17 is provided with a CD mode key 18 for setting and cancelling the CD playing mode, and an eject key 19 for commanding an eject operation of the disk, along with other disk player controls.

The controller 14, which is composed of a microcomputer, controls the loading mechanism 2, the ON/OFF of the loop switch 10, and the slider motor 6. The slider motor controls the position of the pick-up 5, through a slider driving circuit according to the position information generated by the position detector 7. The controller 14 also issues focusing commands to the ramp voltage generation circuit 13, and determines which type of disk is to be played; CD or LD.

Figure 2:
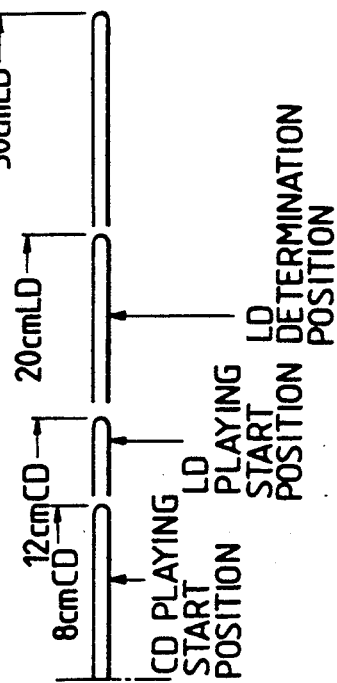
FIG. 2 is a schematic showing the disk size of CD and LD, playing start positions of CD and LD, and LD determination position.

Next, by referring to a flow chart shown in FIG. 3, the process for determining disk type will be described. The process is executed by the processor within controller 14 when a disk is loaded. Once the disk type is determined, as shown in FIG. 2, the pick-up 5 uses the initial playing position, which is near the read-in area of the CD, as the CD determination position. The pick-up 5 uses a position located radially beyond the outer diameter of the 12 cm CD and radially within the outer diameter of the 20 cm LD as the LD determination position.

Figure 3:
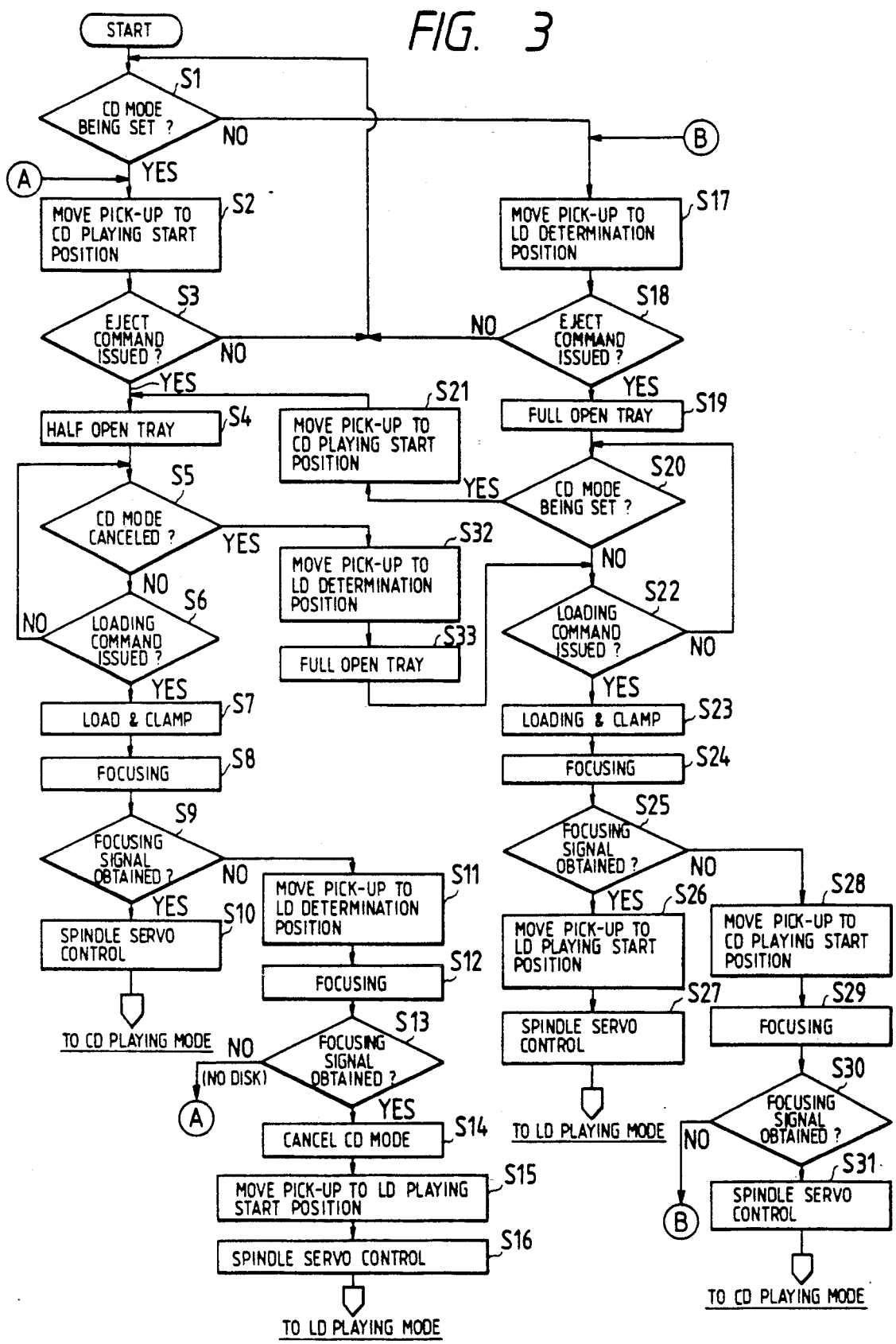
FIG. 3 is a flow chart showing a process for determining disk types.

Referring to FIG. 3, the processor first determines whether or not the CD playing mode is set (step S1). If the pick-up 5 is not in the CD playing position when the CD playing mode is set, the processor controls the slider motor 6 to move the pick-up 5 to the initial CD playing position, and prepares for the subsequent operation (step S2). Thereafter, the processor determines whether or not the eject command has been issued by a manual operation of the eject key 19 (step S3). When the eject command is not issued, the processor returns the flow back to step S1. When the eject command is issued, the processor controls the loading mechanism 2 to open the tray half way (half extrude) to mount a CD on the tray (step S4). To open the tray, half way, an extrusion is provided at the middle of the tray, wherein a limit switch provided on the housing contacts the extrusion, and turns on the limit switch. When the limit switch is turned on, loading mechanism 2 is stopped. Alternatively, it is possible to drive the loading mechanism 2 for the half of the time period needed to completely open the tray.

In this case, if the user wants to play an LD, he or she may cancel the CD playing mode, even if the tray is half open in preparation to receive a CD. Thus, the processor determines whether or not the CD playing mode is cancelled by the operation of the CD mode key 18 (step S5). When the CD playing mode is not cancelled, the processor determines whether or not the loading command is issued (step S6). The loading command may be issued by detecting the output signal of a switch (not shown) which is turned on when the tray is slightly pushed by the user after the disk is set thereon. When the loading signal is issued, the processor commands the loading mechanism 2 to load and clamp the disk (step S7), and issues the focusing command to the ramp voltage generation circuit 13 according to the mounting operation completion detection signal. This mounting detection signal is sent from a disk mounting operation completion detection switch (not shown) (step S8). In accordance with the focusing command, the focus servo control is executed. At that time, the processor determines whether or not the focus servo signal is obtained, depending on whether or not the detection output signal is issued from the zero cross detection circuit 15 (i.e., whether or not a disk is detected). If the focus servo signal is obtained, the processor determines that the CD is mounted in the playing position (step S10), after which, the processor advances the flow to the CD playing mode.

However, when no disk is mounted or when the LD is mounted, the focus servo signal is not obtained. Thus, when the processor determines that the CD is not mounted on the tray in the step S9, the processor commands the slider motor 6 to move the pick-up 5 to the LD determination position (refer to FIG. 2), and prepares for the subsequent operation (step S11). Next, the processor issues the focusing command to the ramp voltage generation circuit 13 (step S12), and determines whether or not the focus servo signal is obtained in this new position (step S13). If the focus servo signal is obtained, the processor determines that an LD is mounted at the playing position, and cancels the CD playing mode (step S14). The processor then instructs the slider motor 6 to move the pick-up 5 to the initial LD playing position (see FIG. 2), which is near the LD read-in area (step S15). After that, the processor execute the spindle servo control (step S16) and advances the flow to the LD playing mode. In the step S13, when the focus servo signal is not obtained, since neither CD nor LD is mounted on the tray, the processor determines that no disk is mounted and advances the flow to the step S2.

On the other hand, when the processor determines that the CD playing mode has not been set in the step S1 and the pick-up 5 is not placed in the LD determination position, the processor directs the slider motor 6 to move the pick-up 5 to the LD determination position and prepared for the subsequent operation (step S17). Thereafter, the processor determines whether or not the eject command is issued from the eject 19 by a manual operation (step S18). When the eject command is not issued, the processor returns the flow to the step S1. However, when the eject command is issued, the processor instructs the loading mechanism 2 to fully open (extrude) the tray to mount an LD (step S19). Then, the processor determines whether or not the CD playing mode has been set by the CD mode key 18 (step S20). If the CD playing mode is set, the processor controls the driving of the slider motor 6 to move the pick-up 5 to the CD playing position and prepare for the subsequent operation (step S21). Flow then returns back to the step S4. When the CD playing mode is set in the state that the tray is fully open, it is not necessary to half open the tray halfway again in the step S4. Instead, it is possible for the processor to return the flow directly back to the step S6.

When the processor determines that the CD playing mode is not set in the step S20, it determines whether or not the loading command is issued (step S22). When the loading command is issued, the processor directs the loading mechanism 2 to load and clamp the disk (step S23). After that, the processor issues the focusing command to the ramp voltage generation circuit 13 (step S24), and thereafter, determines whether or not the focus servo signal is obtained (step S25). If the focus servo signal is obtained, then the LD is mounted on the tray, and the slider motor 6 moves the pick-up 5 to the LD playing position (step S26). The spindle servo control is executed (step S27), and flow returns to the LD play mode.

In the step S25, when the processor determines that the focus servo signal is not obtained, there are two possibilities: one is that a disk is not mounted and the other is that a CD is mounted. Thus, the processor instructs the slider motor 6 to move the pick-up 5 to the CD initial playing position (step S28). After that, the processor issues the focusing command to the ramp voltage generation circuit 13 (step S29), and determines whether or not the focus servo signal is obtained at the CD initial playing position (step S30). If the focus servo signal is obtained, the processor determines that a CD is mounted on the tray, in response to which the spindle servo control is executed (step S31), flow is advanced to the CD playing mode. If the processor determines that the focus servo signal is not obtained (step S30), it determines that no disk is mounted, since neither CD nor LD is mounted, and then thereafter returns the flow back to the step S17.

When the CD playing mode is cancelled in step S5, the processor controls the slider motor 6 to move the pick-up 5 to the LD determination position (step S32). After which, the processor instructs the loading mechanism 2 to fully open the tray (step S33). Flow then returns to step S22. Thus, the LD can be set on the tray.

In the aforementioned manner, the LD determination operation can be eliminated when playing the CD, by setting the CD playing mode through CD mode key 18. Thus, the moving operation of the pick-up 5 is also omissible. Consequently, assuming it takes 3 seconds to load the tray which is half open, 2 seconds to determine if a CD is mounted, and 2 seconds to excecute the spindle servo control, then a total of 7 seconds is required after the disk is loaded until it is played. Thus, approximately 5 seconds can be improved in comparison with the conventional sequence operation, which takes approximately 12 seconds as discussed above. In addition, if playing the LD while the CD playing mode is set, once the processor determines that the LD is mounted at the playing position, it can automatically cancel the CD playing mode, and thereby smoothly play the LD. Moreover, the CD playing mode remains unchanged unless the mode is manually changed or unless the LD is mounted. Thus, when the same type disks are successively played, it is not necessary to set the mode for each new disk.

Furthermore, when the CD playing mode is set, it is possible to save the power of the video system by turning it off.

In the aforementioned embodiment, the CD playing mode was set in accordance with the mode setting command by the CD mode key 18. However, instead of the CD mode key 18, it is possible to accomplish the same result by providing an LD mode key so that it allows the CD playing mode to be set when the LD playing mode command is cancelled by the LD mode key.

As was described above, in the compatible disk player according to the present invention, the setting and the cancellation of the CD playing mode are commanded by manual operations. In the CD playing mode, the pick-up is placed in the initial playing position of the CD in order to prepare for the subsequent operation. When it is determined that the LD is mounted at the playing position or when the cancellation command of the CD playing mode is issued, only then is the ready state of the pick-up in the initial playing position of the CD cancelled, thus, shortening the delay between loading and playing of the CD when the CD mode is set.

What is claimed is:

1. A compatible disk player of the type for playing large and small diameter disks, and having a first operating mode for playing a firs type disk having said large diameter and a second operating mode for playing a second type disk having said small diameter, said compatible disk player comprising:

mode selecting means for manually selecting and canceling one of said operating modes, a pick-up, including a focus lens and a focus servo means for adjusting the distance between said lens and a disk surface, for reading information stored on a disk loaded into said disk player, said pick-up arranged to move along a radial line of said loaded disk, disk size detecting means for detecting whether said first type of disk, said second type of disk or no disk is loaded according to a focus locking state which is indicated by said focus servo means, pick-up control means for moving said pick-up along said radial line to a predetermined position on said second type of disk when said second operating mode is selected, said pick-up control means further comprising means for canceling said second operating mode when said detecting means detects the loaded disk is said first type of disk.

2. The compatible disk player as set forth in claim 1, wherein said predetermined position for said first disk is located radially beyond an outer diameter of the second disk and radially within an outer diameter of the first disk, said pick-up being automatically moved to the first disk predetermined position when the second operating mode is canceled, when the second operating mode is not set, and when the pick-up is unable to focus on a loaded disk.

3. The compatible disk player as set forth in claim 1, wherein said predetermined position for said second disk is located at an initial playing position on said second disk, such that said pick-up is automatically moved to said initial playing position on said second disk when the second operating mode is selected.

4. The compatible disk player as set forth in claim 1, said compatible disk player further comprising:
an objective lens within said pick-up,
a light beam reflected from a loaded disk, which enters said objective lens, wherein said focus servo means also generates a focus lock signal when said focus servo means is in a focus locking state upon the selected disk, and wherein said disk detection means senses said focus locking signal and determines whether the selected disk is loaded based upon said focus locking signal, and means for sensing if the disk has been mounted at said playing position, wherein said sensing means initiates said focusing means.

5. The compatible disk player as set forth in claim 1, said compatible player further comprising a loading mechanism for loading the disk by means of a tray extrudable from said player, said loading mechanism holding said tray in a half open state when in said second operating mode and in a fully open state when in said first operating mode.

6. The compatible disk player as set forth in claim 2, wherein said pick-up control means automatically moves said pick-up from the first disk predetermined position to an initial playing position of the first disk when said disk detecting means senses a focusing signal from the pick-up indicating that the first type of disk is loaded.

7. The compatible disk player as set forth in claim 1, wherein sad first disk is a video disk.

8. The compatible disk player as set forth in claim 1, wherein said second disk is an audio disk.

9. The compatible disk payer as set forth in claim 1, wherein said pick-up control means also remains in said selected operating mode after said selected disk is ejected from said disk player, and until said selected mode is cancelled by the manual selecting or disk detecting means.

10. The compatible disk player as set forth in claim 1, wherein said disk detection means determines whether said loaded disk corresponds to the selected disk based on a focus locking signal from said pick-up indicating whether said pickup has focused on the loaded disk.

11. The compatible disk player as set forth in claim 1, wherein said manual selection means directs said disk size detection means to first test for a disk of the type corresponding to the selected operating mode.

* * * * *